US012613852B2

(12) United States Patent
Hou et al.

(10) Patent No.: US 12,613,852 B2
(45) Date of Patent: Apr. 28, 2026

(54) METHOD AND SYSTEM FOR RETRIEVING INFORMATION FROM TABLE CORPORA USING LARGE LANGUAGE MODELS

(71) Applicant: CGG SERVICES SAS, Massy Cedex (FR)

(72) Inventors: Song Hou, Horsham (GB); Chris Subia-Waud, London (GB)

(73) Assignee: CGG SERVICES SAS, Massy Cedex (FR)

( * ) Notice: Subject to any disclaimer, the term of this patent is extended or adjusted under 35 U.S.C. 154(b) by 0 days.

(21) Appl. No.: 18/801,942

(22) Filed: Aug. 13, 2024

(65) Prior Publication Data

US 2025/0061104 A1      Feb. 20, 2025

Related U.S. Application Data

(60) Provisional application No. 63/586,070, filed on Sep. 28, 2023, provisional application No. 63/519,904, filed on Aug. 16, 2023.

(51) Int. Cl.
| | |
|---|---|
| *G06F 16/00* | (2019.01) |
| *G06F 16/22* | (2019.01) |
| *G06F 16/245* | (2019.01) |
| *G06F 16/248* | (2019.01) |

(52) U.S. Cl.
CPC ........ *G06F 16/2282* (2019.01); *G06F 16/221* (2019.01); *G06F 16/245* (2019.01); *G06F 16/248* (2019.01)

(58) Field of Classification Search
CPC ....... G06F 16/00; G06F 16/2282; G06F 16/22
See application file for complete search history.

(56) References Cited

U.S. PATENT DOCUMENTS

| | | | |
|---|---|---|---|
| 2008/0228800 A1* | 9/2008 | Dettinger ............ | G06F 16/2423 707/999.102 |
| 2021/0064651 A1* | 3/2021 | Ashton Vital Brazil .................... | G06F 17/18 |
| 2024/0168978 A1* | 5/2024 | Goel ................... | G06F 16/2237 |

OTHER PUBLICATIONS

Dimitris Bertsimas et al., "TabText: A Flexible and Contextual Approach to Tabular Data Representation," https://doi.org/10.48550/arXiv.2206.10381, Jun. 2022, pp. 1-17.
Patrick Lewis et al., "Retrieval-Augmented Generation for Knowledge-Intensive NLP Tasks," Facebook AI Research; University College London; New York University; plewis@fb.com, https://doi.org/10.48550/arXiv.2005.11401, Apr. 2021, pp. 1-19.

(Continued)

*Primary Examiner* — Cheryl Lewis
(74) *Attorney, Agent, or Firm* — PATENT PORTFOLIO BUILDERS PLLC

(57)      ABSTRACT

A method for extracting and displaying desired information from a set of tables includes storing a set of tables including information associated with a subsurface of the Earth; receiving a user query; selecting a table from the set of tables based on an embedding search performed for the user query, on a vector database of table-column questions of the set of tables; selecting one or more columns from the table based on a likelihood estimation performed in an embedding space, between (1) the user query and (2) a table summary and descriptions of columns for the selected table; determining one or more rows associated with the one or more columns; and displaying one or more answers in response to the user query.

20 Claims, 8 Drawing Sheets

(56)　　　References Cited

OTHER PUBLICATIONS

Qian Liu et al., "Tapex: Table Pre-Training Via Learning a Neural SQL Executor," Published as a conference paper at ICLR 2022, https://doi.org/10.48550/arXiv.2107.07653, Mar. 2022, pp. 1-19.
Stefan Hegselmann et al., "TabLLM: Few-shot Classification of Tabular Data with Large Language Models," https://doi.org/10.48550/arXiv.2210.10723, Mar. 2023, pp. 1-33.
Victor Zhong et al., "SEQ2SQL: Generating Structured Queries From Natural Language Using Reinforcement Learning," Salesforce Research Palo Alto, CA fvzhong,cxiong,rsocherg@salesforce.com, https://doi.org/10.48550/arXiv. 1709.00103, Nov. 2017, pp. 1-12.

* cited by examiner

| 1 | 2 | 3 | 4 | 5 | 6 |
|---|---|---|---|---|---|
| Litho_formation | Porosity_pct (%) | Density (g/cm³) | Depth (ft) | Permeability (mD) | Water Saturation (%) |
| Garn 2 | 15 | 2.4 | 2000 | 120 | 30 |
| Garn 2 | 12 | 2.5 | 1800 | 150 | 25 |
| Wilcox | 20 | 2.2 | 2500 | 100 | 40 |
| Wilcox | 10 | 2.6 | 2300 | 80 | 20 |
| Svalbard | 18 | 2.3 | 2100 | 200 | 35 |
| Trondheim | 8 | 2.7 | 1900 | 70 | 15 |

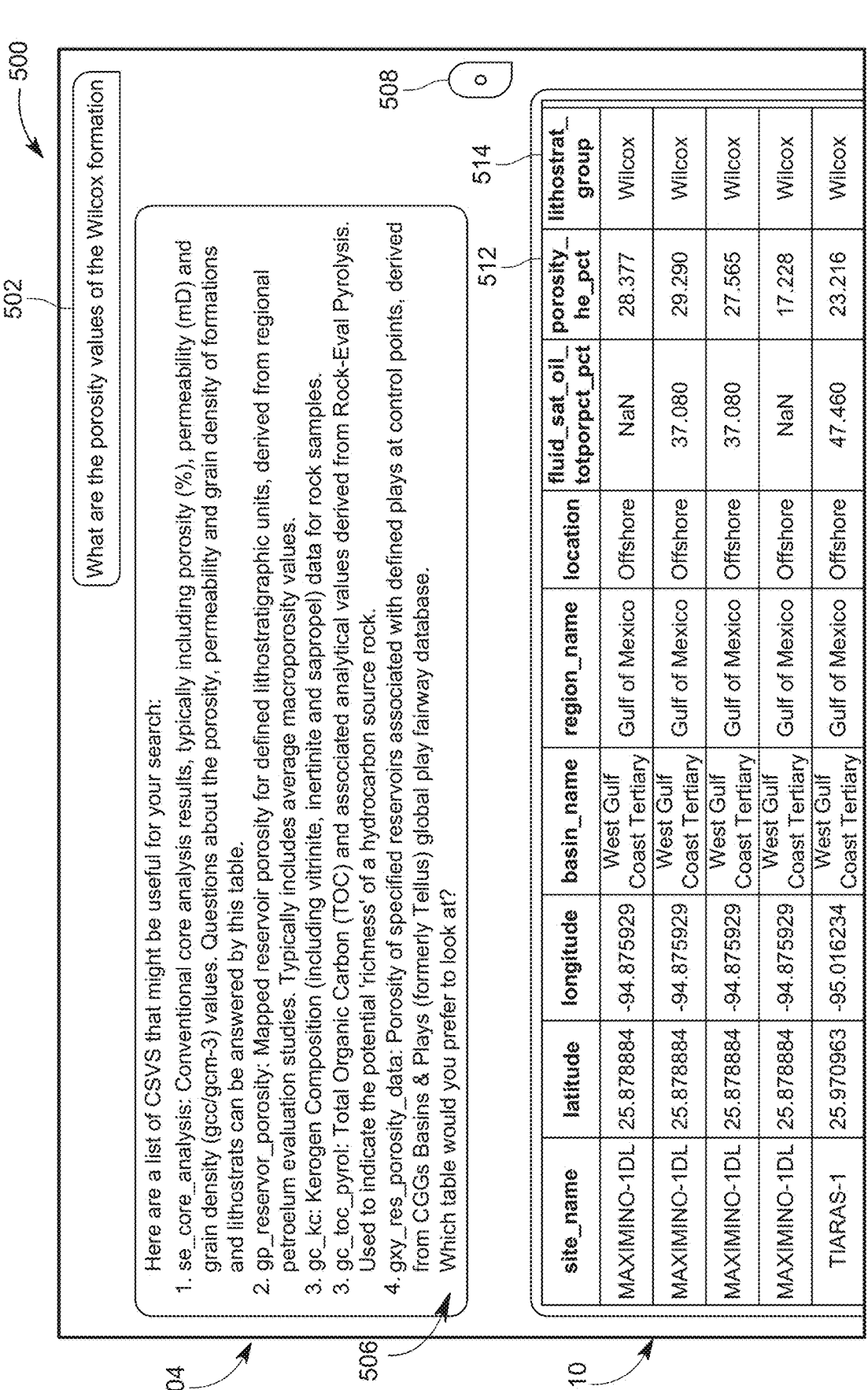

What are the porosity values of the Wilcox formation

Here are a list of CSVS that might be useful for your search:

1. se_core_analysis: Conventional core analysis results, typically including porosity (%), permeability (mD) and grain density (gcc/gcm-3) values. Questions about the porosity, permeability and grain density of formations and lithostrats can be answered by this table.

2. gp_reservoir_porosity: Mapped reservoir porosity for defined lithostratigraphic units, derived from regional petroleum evaluation studies. Typically includes average macroporosity values.

3. gc_kc: Kerogen Composition (including vitrinite, inertinite and sapropel) data for rock samples.

3. gc_toc_pyrol: Total Organic Carbon (TOC) and associated analytical values derived from Rock-Eval Pyrolysis. Used to indicate the potential 'richness' of a hydrocarbon source rock.

4. gxy_res_porosity_data: Porosity of specified reservoirs associated with defined plays at control points, derived from CGGs Basins & Plays (formerly Tellus) global play fairway database.

Which table would you prefer to look at?

| site_name | latitude | longitude | basin_name | region_name | location | fluid_sat_oil_totporpct_pct | porosity_he_pct | lithostrat_group |
|---|---|---|---|---|---|---|---|---|
| MAXIMINO-1DL | 25.878884 | -94.875929 | West Gulf Coast Tertiary | Gulf of Mexico | Offshore | NaN | 28.377 | Wilcox |
| MAXIMINO-1DL | 25.878884 | -94.875929 | West Gulf Coast Tertiary | Gulf of Mexico | Offshore | 37.080 | 29.290 | Wilcox |
| MAXIMINO-1DL | 25.878884 | -94.875929 | West Gulf Coast Tertiary | Gulf of Mexico | Offshore | 37.080 | 27.565 | Wilcox |
| MAXIMINO-1DL | 25.878884 | -94.875929 | West Gulf Coast Tertiary | Gulf of Mexico | Offshore | NaN | 17.228 | Wilcox |
| TIARAS-1 | 25.970963 | -95.016234 | West Gulf Coast Tertiary | Gulf of Mexico | Offshore | 47.460 | 23.216 | Wilcox |

FIG. 5

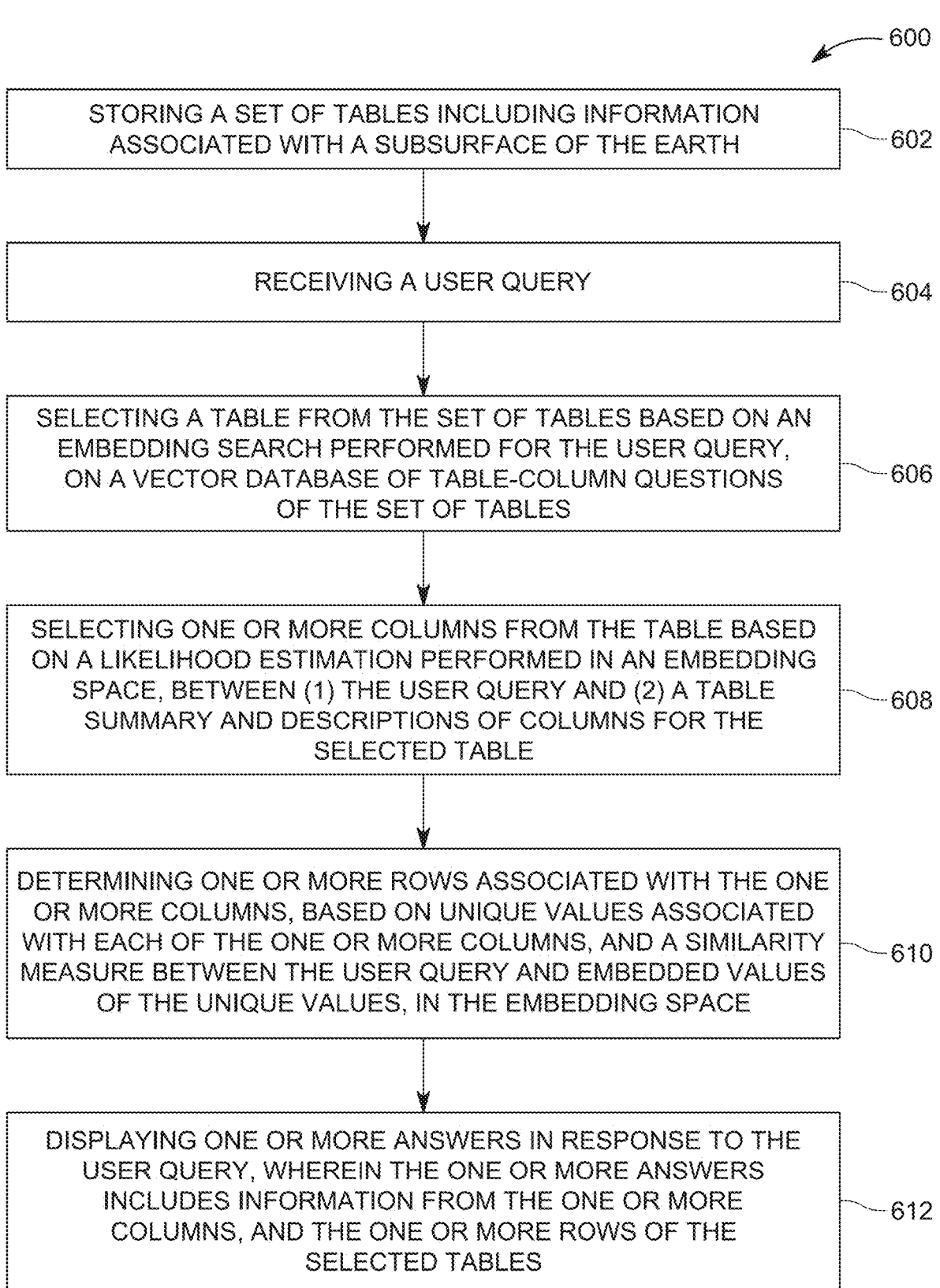

600

STORING A SET OF TABLES INCLUDING INFORMATION ASSOCIATED WITH A SUBSURFACE OF THE EARTH ⎯602

RECEIVING A USER QUERY ⎯604

SELECTING A TABLE FROM THE SET OF TABLES BASED ON AN EMBEDDING SEARCH PERFORMED FOR THE USER QUERY, ON A VECTOR DATABASE OF TABLE-COLUMN QUESTIONS OF THE SET OF TABLES ⎯606

SELECTING ONE OR MORE COLUMNS FROM THE TABLE BASED ON A LIKELIHOOD ESTIMATION PERFORMED IN AN EMBEDDING SPACE, BETWEEN (1) THE USER QUERY AND (2) A TABLE SUMMARY AND DESCRIPTIONS OF COLUMNS FOR THE SELECTED TABLE ⎯608

DETERMINING ONE OR MORE ROWS ASSOCIATED WITH THE ONE OR MORE COLUMNS, BASED ON UNIQUE VALUES ASSOCIATED WITH EACH OF THE ONE OR MORE COLUMNS, AND A SIMILARITY MEASURE BETWEEN THE USER QUERY AND EMBEDDED VALUES OF THE UNIQUE VALUES, IN THE EMBEDDING SPACE ⎯610

DISPLAYING ONE OR MORE ANSWERS IN RESPONSE TO THE USER QUERY, WHEREIN THE ONE OR MORE ANSWERS INCLUDES INFORMATION FROM THE ONE OR MORE COLUMNS, AND THE ONE OR MORE ROWS OF THE SELECTED TABLES ⎯612

FIG. 6

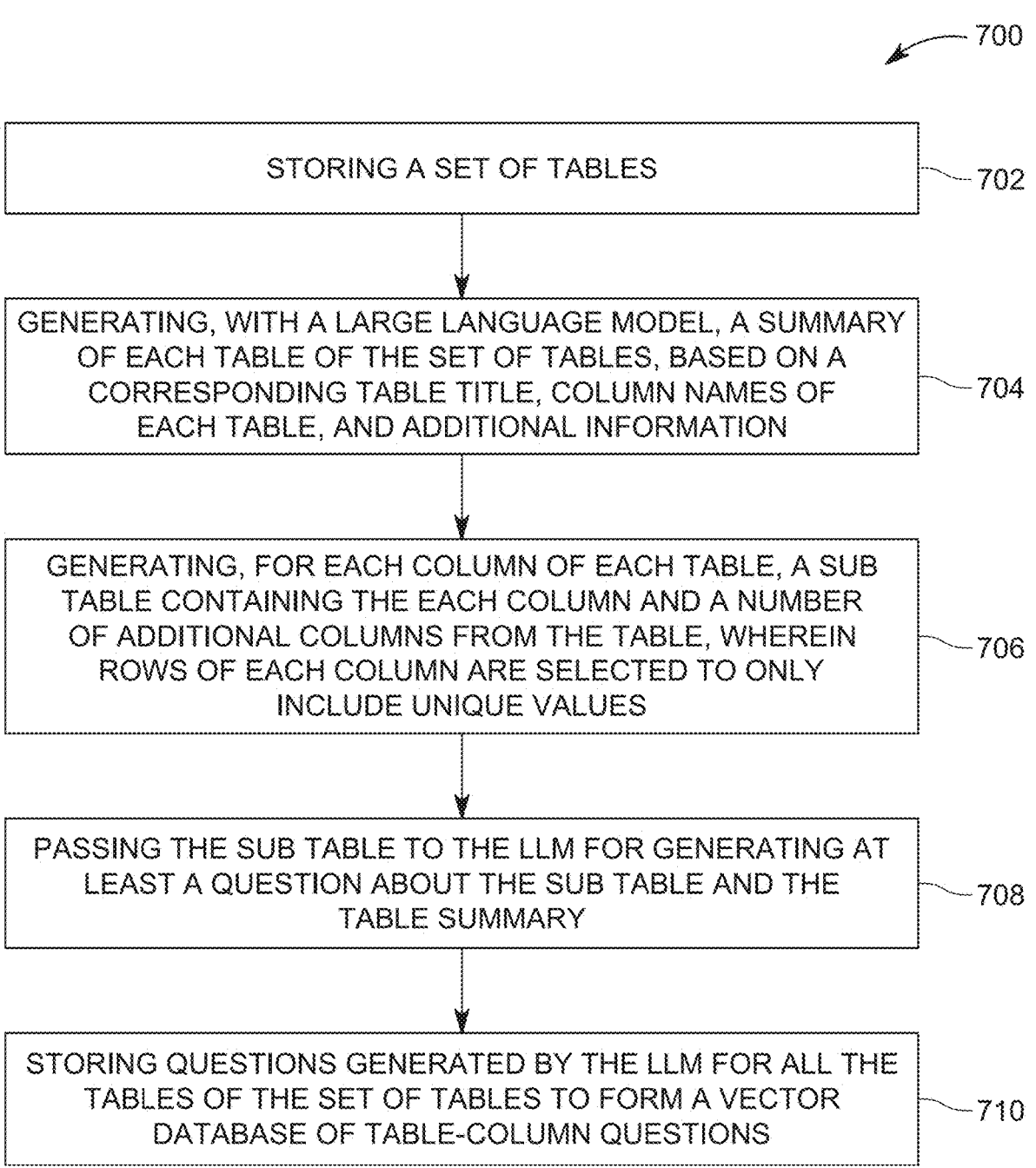

700

STORING A SET OF TABLES — 702

GENERATING, WITH A LARGE LANGUAGE MODEL, A SUMMARY OF EACH TABLE OF THE SET OF TABLES, BASED ON A CORRESPONDING TABLE TITLE, COLUMN NAMES OF EACH TABLE, AND ADDITIONAL INFORMATION — 704

GENERATING, FOR EACH COLUMN OF EACH TABLE, A SUB TABLE CONTAINING THE EACH COLUMN AND A NUMBER OF ADDITIONAL COLUMNS FROM THE TABLE, WHEREIN ROWS OF EACH COLUMN ARE SELECTED TO ONLY INCLUDE UNIQUE VALUES — 706

PASSING THE SUB TABLE TO THE LLM FOR GENERATING AT LEAST A QUESTION ABOUT THE SUB TABLE AND THE TABLE SUMMARY — 708

STORING QUESTIONS GENERATED BY THE LLM FOR ALL THE TABLES OF THE SET OF TABLES TO FORM A VECTOR DATABASE OF TABLE-COLUMN QUESTIONS — 710

FIG. 7

METHOD AND SYSTEM FOR RETRIEVING INFORMATION FROM TABLE CORPORA USING LARGE LANGUAGE MODELS

BACKGROUND OF THE INVENTION

Technical Field

Embodiments of the subject matter disclosed herein generally relate to a system and method for processing information stored in plural tables and extracting, in response to a user query, relevant information from the plural tables, and more particularly, using machine learning for extracting the relevant information.

Discussion of the Background

Various fields, such as oil and gas exploration, geothermal energy capture, carbon capture and storage, minerals and mining exploitation, engineering and environmental, use vast amounts of information. This information may be collected, for example, from actions associated with drilling a well 110 in a subsurface 120, as shown in FIG. 1, or from collecting seismic data by performing a seismic survey associated with the subsurface 120, as illustrated in FIG. 2. FIG. 2 shows a vessel 210 towing plural streamers 212 and a source array 214 in the context of hydrocarbon exploration and development. Both systems 100 and 200 illustrated in FIGS. 1 and 2 are used for exploring the structure of underground formations on land 120 or at sea 220 (i.e., formations beneath the Earth surface 112). As schematically illustrated in FIG. 1, the well 110 extends into the explored subsurface 120, which includes interfaces 122, and 124, which separate subsurface layers or formations 121, 123, and 125. Note that, as used herein, the term "formation" refers to any geological unit present in the subsurface, e.g., beneath land surface or ocean bottom. FIG. 2 shows the same structure of the subsurface 120, but under the water body of the sea 220. While the seismic acquisition system 200 in FIG. 2 uses seismic sensors 216 (only one shown for simplicity) distributed along streamers 212, and a seismic source 214 for generating seismic waves (reflections or refractions of which are recorded by the seismic sensors 216), the well system 100 in FIG. 1 may use a land seismic source 114 and land seismic sensors 116. The source or the sensors for system 100 may also be distributed inside well 110.

No matter the form and configuration in which the data is collected, the amount of collected data for the seismic surveys is vast. The collected data may be used to determine various properties of the subsurface layers and interfaces illustrated in FIGS. 1 and 2, for example, the porosity of the rock, its density, water saturation, permeability, impedance, etc., and the depth at which these parameters are measured. All these parameters and other are indicative, for this case, about the presence or absence of oil and gas. Further, as many seismic surveys are performed each year, seismic data associated with many regions of the earth has already been generated. Thus, at the present, the companies involved in the geophysical field are in possession of seismic related data for many regions of the earth. All this data is currently organized in tables.

Various geological features and geological bodies may be present in the subsurface 120 and one purpose of the well 110 in FIG. 1 or the seismic survey in FIG. 2 is to extract a sample of these features, to determine their location, boundaries, and/or key rock properties (characteristics). All this data is also stored in the above noted tables.

For the exploration field, be it hydrothermal, oil and gas, ore, or any other resource, understanding the key rock properties in a subsurface basin is important. Measurement or inference of key rock properties in a series of geological bodies or units present in the subsurface is necessary for an accurate understanding of the subsurface, for example, for reservoir modelling and simulation. Geological and geophysical techniques are used to detect, quantify, and map geological bodies and associated rock properties, helping exploration teams target areas with higher reservoir potential (for example). These techniques and theoretical calculations further generate geological data, that is added to the tables noted above.

Thus, vast amounts of data are stored in tabular formats for the geophysical field. The same is true for other fields, for example, medicine. These tables are often large and frequently contain overlapping information. While tables are an efficient way to store data, their sheer volume and complexity can make it challenging to extract meaningful information.

Traditionally, a Structured Query Language (SQL) or other similar languages have been needed to meaningfully interact with the data-requiring both domain expertise (geological knowledge) and understanding of the underlying data structures (computer knowledge). For example, SQL is a specialized programming language designed for managing data held in a relational database management system. It allows a user to interact with the database by performing actions such as: inserting new records into the database, modifying existing records, querying the database to extract specific information based on certain criteria, and removing records from the database.

To understand how SQL works, it helps to imagine a database like a well-organized warehouse, where data is stored in tables. Each table represents a specific type of entity (e.g., customers, products, orders). Within each table, rows represent individual records, and columns represent the different attributes or properties of those records. SQL provides a set of commands that allow the user to communicate with this database. The user can write SQL queries to select, insert, update, or delete data within these tables.

However, finding the right person that has knowledge in both fields (geophysics and computer science) is difficult. With the recent technological advancements of large language models (LLM), it is now theoretically possible to interact with the tables using the natural language. Thus, there is a need for a new workflow and system for extracting desired information from plural tables without using SQL or similar specialized software, to overcome the aforementioned challenges.

SUMMARY OF THE INVENTION

According to an embodiment, there is a method for extracting and displaying desired information from a set of tables. The method includes storing a set of tables including information associated with a subsurface of the Earth, receiving a user query, selecting a table from the set of tables based on an embedding search performed for the user query, on a vector database of table-column questions of the set of tables, selecting one or more columns from the table based on a likelihood estimation performed in an embedding space, between (1) the user query and (2) a table summary and descriptions of columns for the selected table, determining one or more rows associated with the one or more columns, based on unique values associated with each of the one or more columns, and a similarity measure between the user query and embedded values of the unique values, in the embedding space, and displaying one or more answers in response to the user query, wherein the one or more answers includes information from the one or more columns, and the one or more rows of the selected table.

According to another embodiment, there is a computing system for extracting and displaying desired information from a set of tables. The computing system includes a storage device configured to store a set of tables including information associated with a subsurface of the Earth, an interface configured to receive a user query, and a processor connected to the storage device and the interface and configured to select a table from the set of tables based on an embedding search performed for the user query, on a vector database of table-column questions of the set of tables, select one or more columns from the table based on a likelihood estimation performed in an embedding space, between (1) the user query and (2) a table summary and description of the columns for the selected table, determine one or more rows associated with the one or more columns, based on unique values associated with each of the one or more columns, and a similarity measure between the user query and embedded values of the unique values, in the embedding space, and display one or more answers in response to the user query, wherein the one or more answers includes information from the one or more columns, and the one or more rows of the selected table.

According to yet another embodiment, there is a method for generating a vector database of table-column questions for a set of tables. The method includes storing the set of tables, generating, with a large language model, a summary of each table of the set of tables, based on a corresponding table title, column names of each table, and additional information, generating, for each column of each table, a sub table containing the each column and a number of additional columns from the table, wherein rows of each column are selected to only include unique values, passing the sub table to the LLM for generating at least (1) a question about the sub table and the table summary and (2) a corresponding answer, and storing questions and answers generated by the LLM, for all the tables of the set of tables, to form a vector database of table-column questions.

According to yet another embodiment, there is a non-transitory computer readable medium including computer executable instructions, wherein the instructions, when executed by a processor, implement the methods discussed herein.

BRIEF DESCRIPTION OF THE DRAWINGS

For a more complete understanding of the present invention, reference is now made to the following descriptions taken in conjunction with the accompanying drawings, in which:

FIG. 5 schematically illustrates the input and output to the LLM for a specific user query;

FIG. 6 is a flow chart of a method for extracting information in response to a user query from a series of tables;

FIG. 7 is a flow chart of a method for training an LLM with a series of tables including geological information.

DETAILED DESCRIPTION OF THE INVENTION

The following description of the embodiments refers to the accompanying drawings. The same reference numbers in different drawings identify the same or similar elements. The following detailed description does not limit the invention. Instead, the scope of the invention is defined by the appended claims. The following embodiments are discussed with regard to an LLM based method for searching information stored in plural tables and extracting desired information without the need of a structured query language. However, the embodiments to be discussed next are not limited to LLM algorithms and may apply to other machine learning algorithms.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 1:
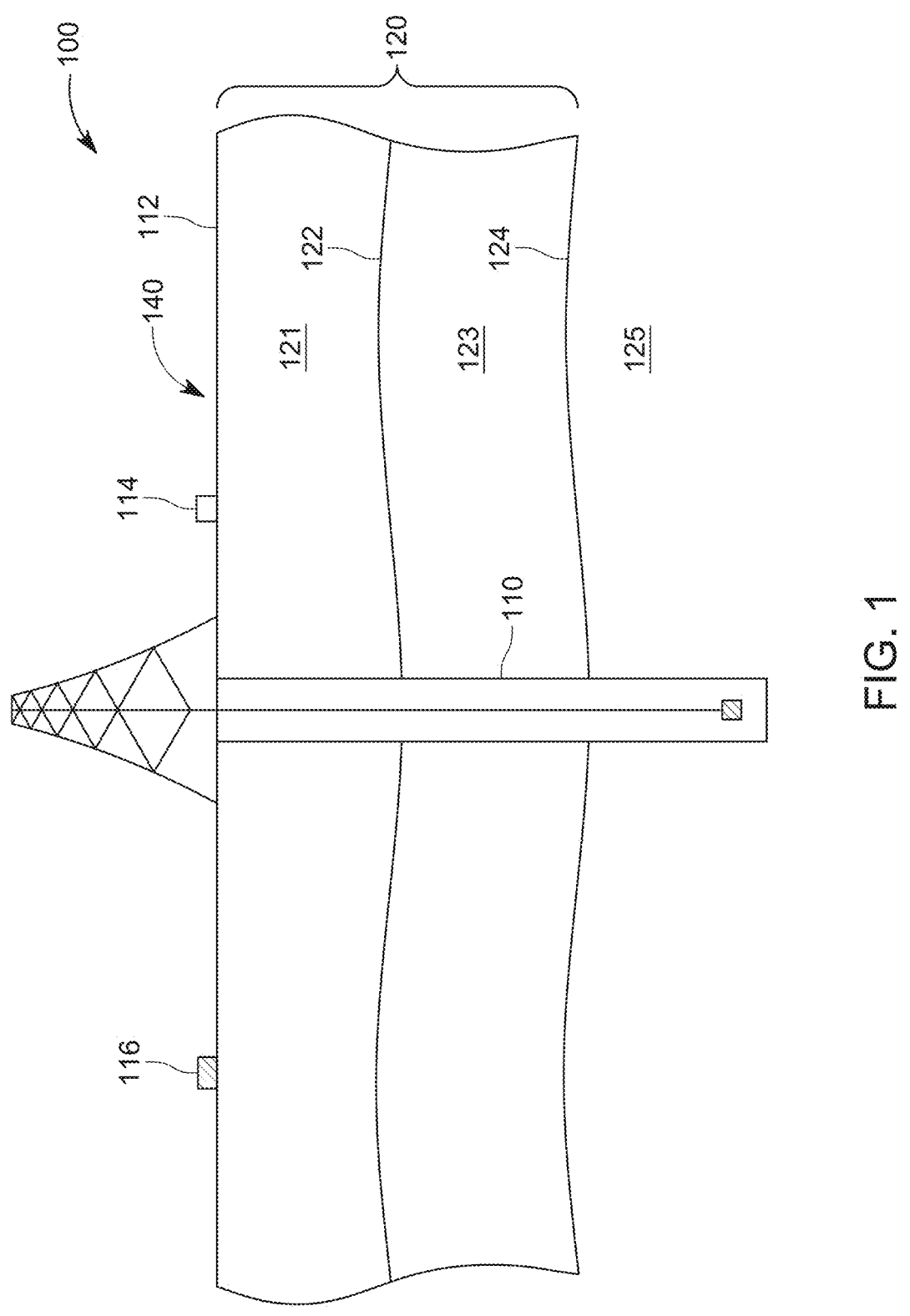
FIG. 1 is a schematic diagram of a land based well for collecting a subsurface sample.
Figure 2:
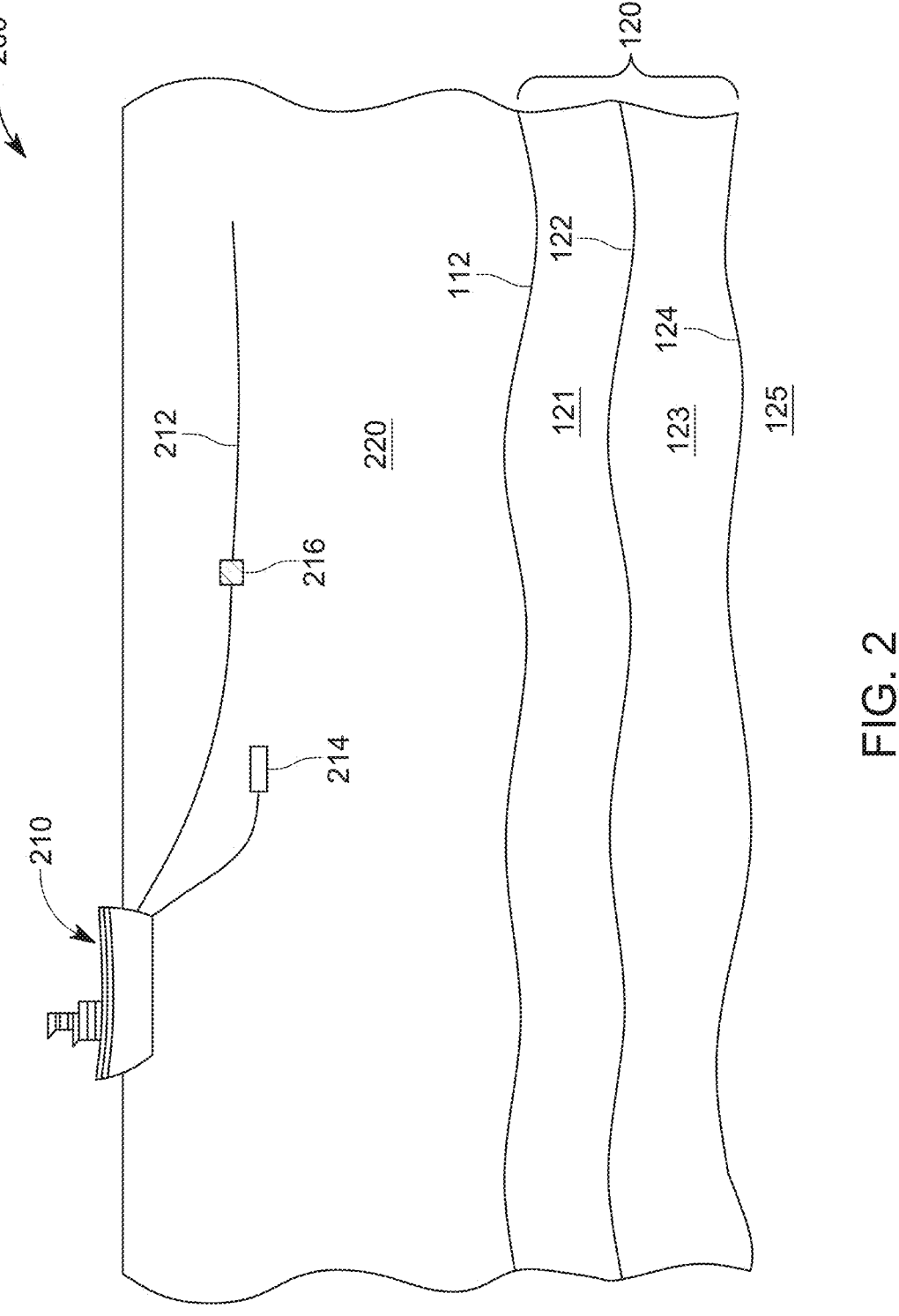
FIG. 2 is a schematic diagram of a seismic survey acquisition system for collecting seismic information about a subsurface.
Figure 3:
FIG. 3 is an example table that provides geological information for various underground structures.

FIG. 3 illustrates an example table 300 holding information about four lithographic formations. For practical/actual situations, the size of the table is much larger. However, for illustrating the novel concepts to be introduced, the size of table 300 is believed to be enough. In this embodiment, table 300 has six rows 1-6, with four rows describing a region that was surveyed and associated seismic data has been collected. Note that two rows are repetitive, i.e., they are characterized/described by the same information, "Garn2" and "Wilcox" for this example. This name/information is considered in this disclosure to be a "unique value" describing a row. Therefore, for table 300, there are six rows described by four unique values. This means that a previous seismic survey has collected the Garn2 data at a first point in time and this data has been stored at row 2. A later in time survey, also of the Garn2 formation, provided results at a different depth, and these results are stored in row 3, under the same unique name.

Table 300 further includes six columns 1-6, with the last five columns describing a certain property of the surveyed region. For example, column 2 describes the porosity of the rock, column 3 describes the density of the rock, column 4 indicates the depth at which the characteristics from the other columns were measured, column 5 describes the permeability of the rock, and column 6 describes the water saturation of the rock. More or less columns may be present. Note that the data presented in table 300 may be directly or indirectly measured for a given lithographic formation. An indirect measurement may include using a model to calculate that data. A set of such tables are considered to be available for the embodiments discussed next.

Table 300 may have a name, for example, "se_core_analysis.csv." Those skilled in the art would understand that a database may include many such tables, each table having a unique name. However, the information stored in one table may overlap with the information stored in another table, i.e., some columns and/or rows may be the same. The corpora of tables 300 form a set or database of tables.

Previously, for finding, for example, the porosity of the Garn2 formation, an SQL trained engineer had to use the following SQL command:

"SELECT porosity_pct [command for selecting the correct column]

FROM se_core_analysis.csv [command for indicating the correct table]

WHERE litho_formation='Garn2" [command for selecting the correct row].

Any mistake made in the writing of the above commands will make the search of the table to fail. Also, the geoscientist had to remember the exact syntax for the SQL commands. Thus, the geoscientist is required to have knowledge of both the table's name 'se_core_analysis.csv', the column names 'porosity_pct', 'litho_formation', and the data represented under the 'Garn 2' name. In addition, the traditional methods are not accurate for reasons to be discussed later.

According to an embodiment, the method to be discussed next is able to use the naturally language query for finding the same information, i.e., the geoscientist can simply ask the LLM the following:

"Find me the average porosity values of the Garn2 Formation at depth 2000 m," and have many tables (not only table 300) automatically searched over for the correct information and have the LLM outputs the results as a natural language response:

"The average porosity of the Garn2 formation—as taken from table 'se_core_analysis', is '13.5%'."

The ability to search across multiple tables, identify pertinent columns and rows, and subsequently feed this information into a large-language model greatly simplify the existing process of extracting desired information from a large database, and relieves the need of having geoscientists being also trained as computer programmers. Such a capability would not only streamline data extraction but also enhance the accuracy and relevance of the information retrieved and widen the ease with which users can interact with the data.

Unfortunately, the current LLM's have very limited context windows and have computational expenses which are cubic with the size of their inputs and thus, filtering is required for large tables before the query and data can be passed in and the answer generated. Thus, to improve the speed of the system, the method to be discussed with regard to FIG. 4 uses alternative concepts to overcome the need for high computational needs.

Embedding the columns/rows using LLMs has emerged as a promising approach in doing this filtering with natural language but still suffers when the table/column descriptions (and thus the embeddings) are not well described or have overlap. The inherent challenge lies in the ambiguity and lack of standardization in table descriptions. Two tables with similar data might have entirely different column names or structures. Moreover, the same piece of information might be represented differently across tables, leading to redundancy and potential misinformation.

The concept of "embedding" an LLM (Large Language Model) into a column/row of a table means storing a numerical representation (effectively, a set of numbers that can be considered to be a vector) for text, number, or other type data stored within that column. This numerical representation, called an embedding, captures the semantic meaning and relationships between words, numbers, and/or phrases in the column or row. The embedding relies on pre-training the LLM. A powerful language model (like GPT) is pre-trained on massive amounts of data (that may include text, numbers, etc.). This training allows the model to understand the nuances of language. The LLM processes each text entry in the table column or row and generates a corresponding embedding (vector). This embedding is a high-dimensional vector (a set of numbers) that represents the meaning of the text in mathematical form. The embeddings are then stored in the table column, often alongside the original text data. Such embeddings can then be mathematically processed with existing mathematical methods, e.g., similarity measures.

Embeddings enable more accurate and relevant search results. Instead of matching exact keywords, the search engine can compare the embeddings of the search query with the embeddings stored in the table, finding entries with similar meanings even if they do not contain the exact same words. In one application, embeddings can be used to group similar text entries together. This can be helpful for organizing large amounts of unstructured text data. Specialized vector databases are used to store and index embeddings efficiently, allowing for fast similarity searches.

The existing approaches for searching large amounts of data stored in plural tables suffer when table sizes are too large for the context windows of the LLMs. For example, Seq2SQL, which was introduced in [1], is an end-to-end natural language approach which takes the user input text as input and uses a BERT style transformer along with a reinforcement learning agent to directly output the relevant SQL to query the database. BERT (Bidirectional Encoder Representations from Transformers) is a deep learning component that allows BERT to learn bidirectional representations. Transformers are a type of neural network architecture that can process words in relation to the entire sentence at once, rather than individually. They do this by using attention mechanisms to gather information about the context of a word and encoding that context into a vector. This approach suffers when scaling larger tables and needs to be fine-tuned when new tables are introduced.

The RAG models, introduced in [2], look to introduce additional context to the seq2seq type models through a query encoder and retrieval model. These models had limited success over the other models.

The current state-of-the-art model TaPEx [3], for table questions and answers (Q&A) sessions, formulates pre-training over a synthetic corpus of SQL execution tasks before training on table Q&A order to improve performance. Whilst demonstrating good performance, this approach does not work well for larger tables due to memory issues.

The TabText model [4] is an attempt to make the input tables more like the general sequences that large language models are trained on. This method takes table row entries and turns them into sentences before putting them into a language model to produce the answer. This approach uses a BERT model and was followed up with TabLLM which instead uses chat-gpt [5]. These approaches would require that the columns in the table would be able to be linked into a coherent sentence. These approaches also suffer from memory issues when the number of columns in the table is large.

The existing approaches for searching large amounts of data stored in plural tables are unable to combine table search, filtering, and question and answers sessions.

According to an embodiment, a method that addresses the aforementioned challenges is now discussed. By leveraging advanced algorithms and techniques, the new method can intelligently navigate through vast sets of tables, recognize patterns, identify relevant columns and rows, and integrate this data seamlessly with large language models. This not only enhances the efficiency of data retrieval but also ensures that the information fed into the language model is accurate, relevant, and devoid of redundancies.

The proposed method can interact with tables that can contain numeric, string, or date/time format types where individual elements (cells) are up to a length of 50 characters-longer columns (such as polygon shape) are discounted in the search. The row identification component uses columns of string type in order to do the row filtering. The row identification component utilizes columns containing string data to filter rows. The data tested on many tables (e.g., 374 tables) contains a range of earth science properties, from chemical properties of rock samples to the locational and oil production viability of global wells. Exemplary table 300 is a simplified version of such a table.

Figure 4:
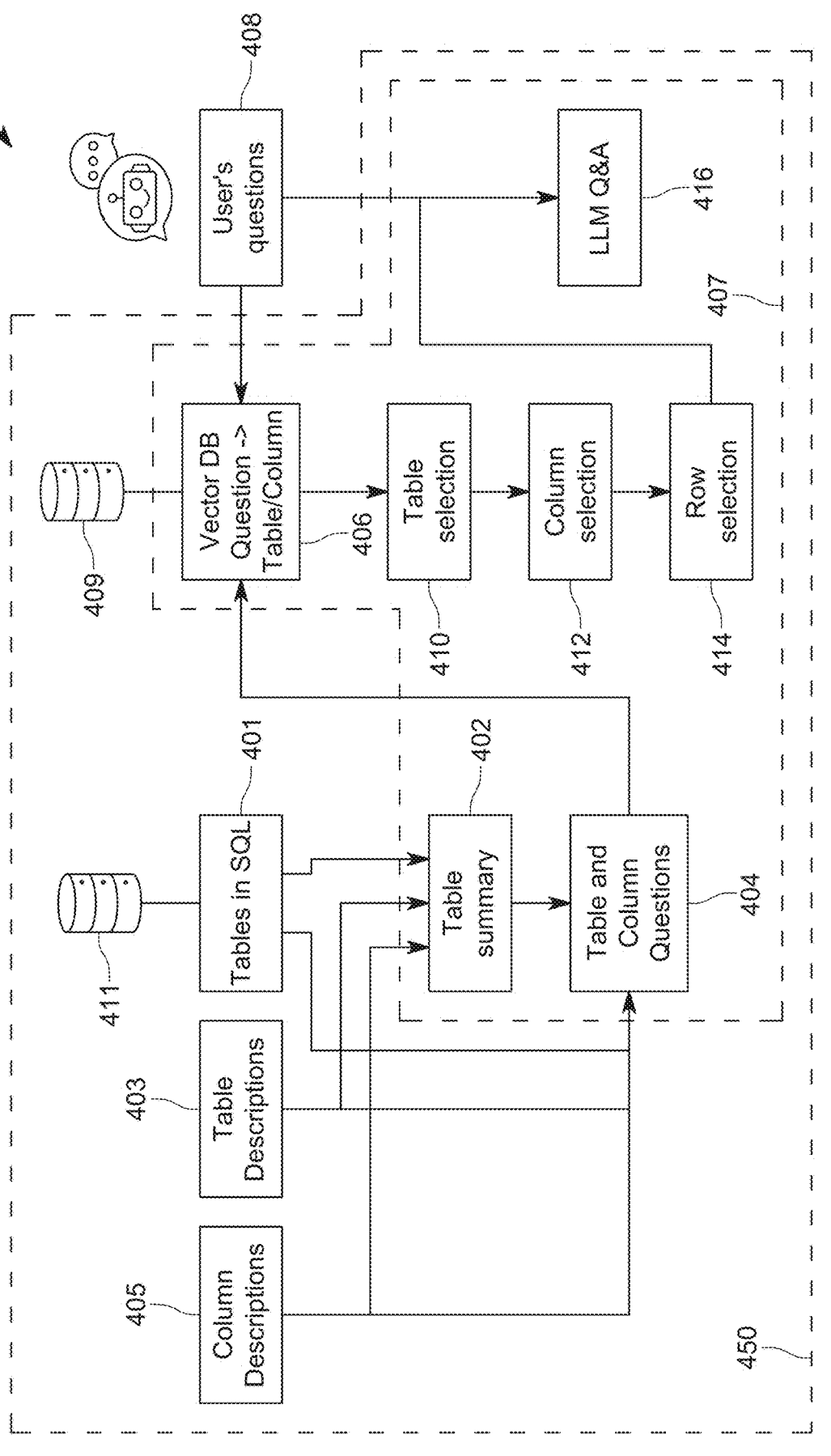
FIG. 4 is a flow diagram of a method for training an LLM with a set of tables including geological information and then using a natural language to input a user query and generate a response with relevant information.

According to an embodiment, a method 400 for searching a large number of tables (set of tables) 401 is schematically illustrated in FIG. 4. The method 400 includes a step 402 of generating a table summary for each table of the set of tables 401. This step receives as input, the name of the table, the columns of the table (e.g., how many there are and their description), and any other available information about the table, for example, text descriptions, captions, etc. All this info may be stored in a table description storage 403 and/or a column description storage 405.

During step 402, the above noted information is fed to an LLM 407 along with a prompt asking the LLM to generate a description of this table. The LLM 407 may be implemented in a computing device 450, which is discussed later with regard to FIG. 7. The output of this process is a concise summary of the table, capturing its essence and primary content. This generated data may be saved to a vector database 409, e.g., FAISS, Pinecone, or other known databases. Note that step 402 is applied to each table from the set of tables 401 that are examined or searched. The set of tables are stored in a SQL table database 411.

For example, with regard to table 300, step 402 may have the following inputs:

1. Table name: se_core_analysis.csv
2. Table description from user (optional): This table collates key geological properties of formations like Garn2, Wilcox, Svalbard, and Trondheim, essential for engineering and exploration activities.
3. Column names and their descriptions:
   i) Litho_formation: Name of the geological formation.
   ii) Porosity_pct (%): Percentage of pore space in the formation.
   iii) Density (g/cm³): Mass per unit volume of the formation.
   iv) Depth (ft): Vertical depth of the formation from the surface.
   v) Permeability (mD): Formation's fluid transmission ability.
   vi) Water Saturation (%): Percentage of water in the pore spaces.

The output of step 402, based on the above input from table 300, may be the concise summary: "table of se_core-_analysis.csv provides essential data on various geological formations such as Garn2, Wilcox, Svalbard, and Trondheim. It includes information on porosity, density, depth, permeability, and water saturation of each formation. This concise summary aids in the assessment and management of geological resources, facilitating targeted engineering, and exploration strategies."

Next, method 400 advances to step 404 for generating column questions and their description. The input to this step is the table summary generated in step 402, and the column names and other type of description of the columns (from storage 403 and 405). The column names and other type of description of the columns may also be from existing documents or provided by experts in the geoscience field.

Step 404 processes each column in table 300, to create an associated sub-table containing both the selected column and a number (1-4) of other columns from the table. The number of other columns may be randomly selected, and the columns may also be randomly selected. In one application, this step generates as many as possible sub-tables. The process of step 404 then samples rows (a couple of rows for each column, not necessary all the rows of a given column; for the example of FIG. 3, only rows 1, 3, 4, and 6 for each column) for each unique value (which was discussed above with regard to the name of the rows) of the selected column and passes the generated sub-table to the LLM 407, which generates a one-sentence question that a user might ask about the sub-table and the table description. Note that the one-sentence question is generated for each sub-table. Regarding the term "unique value" noted above, table 300 in FIG. 3 shows, for example, for the column "Lith_formation," twice the value of "Garn2" and twice the value of "Wilcox." Process 404 considers only once these repetitive values, i.e., the unique value for a given column is "Garn2," "Wilcox," "Svalbard," and "Trondheim." In other words, when the rows of the column "Density" are sampled, only one of the two "Garn2" rows is sampled, i.e., a unique row value for any given column.

The process 404 is configured to ensure that, within all generated sub-tables, there is at least one sub-table containing all of the unique rows of the table. This enables the process 404 to be sure that the generated questions cover all of the data of table 300. The output of this step is the generation of a set of questions for every column in the table, which provides a clear understanding of the data in each column.

For example, the input to step 404 is a selected table and its summary (which was generated in step 402). This might be "se_core_analysis.csv: This table provides essential data on various geological formations such as Garn2, Wilcox, Svalbard, and Trondheim. It includes information on porosity, density, depth, permeability, and water saturation of each formation. This concise summary aids in the assessment and management of geological resources, facilitating targeted engineering and exploration strategies."

The selected columns and their descriptions might be:
1) Litho_formation: Name of the geological formation.
2) Porosity_pct (%): Percentage of pore space in the formation.

The output of process 404 might be:
"Q: Which geological formation has a porosity of 15%? A: The geological formation with a porosity of 15% is Garn2."

For this step, the database 409 is configured to store all this information (i.e., questions and answers). Note that the questions and answers generated in step 404 are embedded, i.e., vectors are generated to describe the questions and answers. The vector embedding of the questions and answers are saved to a vector database 409 during step 404. Each column of each table includes at least one associated vector. More vectors for each column may be generated. These vectors will be later used for performing the search of the tables.

The vector database 409 is then used to generate answers to the questions input by a user in step 408. The question raised by the user (called "user query") is also embedded by the LLM 407, so that a corresponding vector (called "question vector" in this document) is generated. Based on the question vector received from the user in step 408, the method selects first a table (e.g., table 300) out of the set of tables 401, which may be stored in the database 409. Note that database 409 refers to the physical structure holding the vector database 406 generated in step 404.

The table selection step 410 receives as input the user query from step 408. The table selection step 410 uses the vector database 406 for performing an embedding search. The embedding search is performed on the table-column questions generated in step 404 and stored in the vector database 406, to identify the table most likely to contain the answer to the user query. Note that both the user query and the questions generated in step 404 were embedded, i.e., they were transformed into corresponding vectors of N dimension, where N is any non-zero integer. The value of N is chosen depending on the desired granularity of the search and the computational cost. Because all the questions are expressed as mathematical vectors, similarity measures and other mathematical algorithms may be used to process this information.

In one example, the LLM 407 is configured to take the top 'k' most similar questions (from the database 409, for the tables of the set of tables) to the user query. These questions are those questions generated in step 404. The LLM 407 then sums the reciprocal of the sim-scores for each table and returns the table with the most similar questions (generated in step 404) to the user query. The sim-score is a similarity score used in machine learning, and it can be one of a cosine similarity (i.e., the cosine of the angle between two mathematical vectors corresponding to two questions, a user question and a question generated in step 404), Euclidian distance, L1 distance, etc. In this embodiment, the cosine similarity is used as the metric of similarity, and k=100. Other similarity measures and other values for k may be used. Thus, this embodiment returns the similarity scores between the user question and k=100 questions generated by step 404 for each table, and calculates the sum of the reciprocal of scores grouped by table, to provide the table mostly likely to have a sub-table of information that can be used to answer the user query. Therefore, the output of step 410 is the most relevant table from the set of tables 401 for the user query.

The method then advances to step 412 for determining the most relevant column in the selected table. For the sake of an example, it is considered that the selected table in this embodiment is table 300. The input to step 412 is the table summary from step 402 (which might be stored in vector database 406), the column descriptions of the table, as generated in step 404 (which might be stored in vector database 406) or provided by the user, and the user query received in step 408.

Step 412 performs a similarity search (for the table selected in step 410) for the 'kk' (positive integer) most similar questions, relating to the user query, associated with the table summary and the description of columns in the table (both questions and query are embedded using the LLM 407). The method then assigns a 'score' to each column and adds up the reciprocal similarity scores for each question. The cosine similarity may be used in the embed-ding space (other similarity measure may be used as discussed above with regard to step 410) to determine how close the user query is to the generated questions related to a particular column. Step 412 returns, for example, the top 10 columns (other number is also possible) that are most likely related to the user query. The output of step 412 is an ordered list of columns with scores, where the bigger the score, the more likely to be a most representative column for the user query.

Next, the method advances to step 414 for determining the relevant row(s) of the selected column/table. The input for this step includes the unique values (from step 404) from the identified columns (in step 412), for the user query 408. In step 414, the unique values of the relevant columns are embedded, and a similarity search (again using cosine similarity, but other measure is also possible) is performed against the user query. This process identifies the rows that match the query based on a predefined threshold. If an element of a row is close enough to the user query in the embedding space (i.e., the similarity between the embedding of the row and the user query is larger (or smaller) than the predefined threshold), then that row is added to the rows to be returned. For example, for the table 300, a row element containing 'Garn2' will be returned as being similar enough to the user query "What is the average porosity of the Garn Formation" whereas the row element 'Wilcox' will not, because in the embedding space, the term 'Garn2' and the user query are close to each other (when their embedding are compared using the predefined threshold). The output of step 414 is one or more rows (e.g., a subset of rows) from the table, where the rows are the most likely to answer the user query.

Having selected the table, the most relevant column(s) from the table, and the most relevant row(s) for each of the most relevant columns, the LLM 407 is configured to provide an answer in step 416 to the user query 408. Thus, the input to this step are the relevant row and column subset from the selected table, and also the user query. Step 416 provides all this info to the LLM 407 and asks the model to provide a natural language answer to the user query. The output of the LLM 407 includes a comprehensive answer to the query. Note that depending on the threshold selected in step 412 (i.e., the value of kk), the answer may include a single answer (if kk=1, i.e., only one relevant column was selected in step 412) or the answer may include plural answers, each with different weights (if kk>1). For example, if the user query was "what formation has a density between 2.2 and 2.3 for a depth range of 2100 to 2500 m," based on the selection of table 300, the LLM 407 may provide two answers "Wilcox" and "Svalbard."

Thus, the method illustrated in FIG. 4 offers a systematic and efficient approach to navigate large datasets, identify pertinent information, and leverage the capabilities of large language models to answer user queries. The integration of table summaries, column descriptions, and similarity searches ensures that the system provides accurate and relevant answers, making it a valuable tool for various applications.

Among some of the features that characterize the method of FIG. 4, it is noted the following: automatically generating descriptions of table and columns (steps 402 and 404) to be used downstream, creating a set of questions based on sub-tables (step 404) for each table-column-unique-value combination using an LLM model, filtering the tables and columns (steps 412 and 414) using the similarity between user queries and the generated LLM questions, and an end-to-end approach to search, filter, and answer questions.

The method discussed above has been applied to a set of tables (five in this example) including information about various formations and their characteristics. This information is stored in tables se_core_analysis, gp_reservoir_porosity, gc_kc, gc_toc_pyrol, and gxy_res_porosity_data, as illustrated in the table 500 in FIG. 5. The user asked 502 the LLM "what are the porosity values of the Wilcox formation?" Note that some of the tables in FIG. 5 include porosity information while other tables might not include this information. The method generated 504 a summary for each table, and asked 506 the user to select the desired tables. For this embodiment, the user selected table 0, i.e., se_core_analysis, based on the summary of each table generated by the LLM. Then, the LLM returns 510 possible site names, their geographical location in the Wilcox formation, and the porosity at those site names. Note that two different columns 512 and 514 were returned in this example. Also note that the site names may be associated with onshore or offshore locations, depending on the selected formation.

From this example, it is noted that although the user did not specify in step 508 a specific column of the desired table, the LLM identified two relevant columns 512 and 514, i.e., porosity_he_pct and lithostrat-group, that include the relevant information.

A flow chart of a method 600 for processing a large number of tables and extracting relevant information in response to a user query is illustrated in FIG. 6 and now discussed. Method 600 includes a step 602 of storing a set of tables including information associated with a subsurface of the Earth, a step 604 of receiving a user query, a step 606 of selecting a table from the set of tables based on an embedding search performed for the user query, on a vector database of table-column questions of the set of tables, a step 608 of selecting one or more columns from the table based on a likelihood estimation performed in an embedding space, between (1) the user query and (2) a table summary and descriptions of columns for the selected table, a step 608 of determining one or more rows associated with the one or more columns, based on unique values associated with each of the one or more columns, and a similarity measure between the user query and embedded values of the unique values, in the embedding space, and a step 610 of displaying one or more answers in response to the user query, wherein the one or more answers includes information from the one or more columns, and the one or more rows of the selected table.

In one embodiment, the vector database of table-column questions includes a table summary for each table of the set of tables, and the table summary is generated, for each table, by a large language model (LLM) based on (1) a table name, (2) columns of the table, and (3) additional information added by the user. The vector database of table-column questions further includes a set of questions generated by the LLM, for each column of the table, based on the corresponding table summary, column names, and description of the columns provided by the user.

The step of selecting the table may include performing an embedded search between (1) the user query and (2) the set of questions generated by the LLM, from the vector database of table-column questions, for a number k of columns from the table that have a highest similarity score with the user query. A reciprocal of the k highest similarity scores, for the k columns, is summed up for each table of the set of tables, and the table having the highest score is the selected table.

The step of selecting one or more columns includes performing a similarity search for the one or more columns based on questions, from the vector database of table-column questions, associated with the one or more columns of the selected table, assigning a similarity score to each column of the one or more columns, wherein the similarity score is obtained by adding reciprocal similarity scores for each question associated with each column, and applying a cosine similarity in the embedding space to determine the one or more columns. In one application, the one or more columns includes about ten columns.

The step of determining one or more rows includes finding the unique values in each column of the one or more columns, embedding the unique values, and performing a similarity search between the embedded unique values and the user query to determine the one or more rows.

The method may further include a step of selecting answers from the vector database of table-column questions that correspond to questions associated with the selected one or more rows.

A method 700 for generating a vector database 406 of table-column questions for a set of tables 401 is now discussed with regard to FIG. 7. The method 700 includes a step 702 of storing the set of tables, a step 704 of generating, with a large language model, a summary of each table of the set of tables, based on a corresponding table title, column names of each table, and additional information, a step 706 of generating, for each column of each table, a sub table containing the each column and a number of additional columns from the table, where rows of each column are selected to only include unique values, a step 708 of passing the sub table to the LLM for generating at least (1) a question about the sub table and the table summary and (2) a corresponding answer, and a step 710 of storing questions and answers generated by the LLM, for all the tables of the set of tables, to form a vector database of table-column questions.

The additional information includes user added information about the table. The sub-table includes between 1 and 4 additional columns and the additional columns are randomly selected from a corresponding table. At least one sub-table for each table includes the rows corresponding to all the unique values.

The methods discussed herein represent an advancement over other existing methods because they are capable of extracting relevant information from a high number of tables with reduced computational cost. The methods discussed herein may be applied not only to the field of subsurface exploration, for example, hydrocarbon exploration and development, geothermal exploration and development, and carbon capture and sequestration, or other natural resource exploration and exploitation. They could also be employed for surveying and monitoring for windfarm applications, both onshore and offshore, and also for medical imaging applications.

Figure 8:
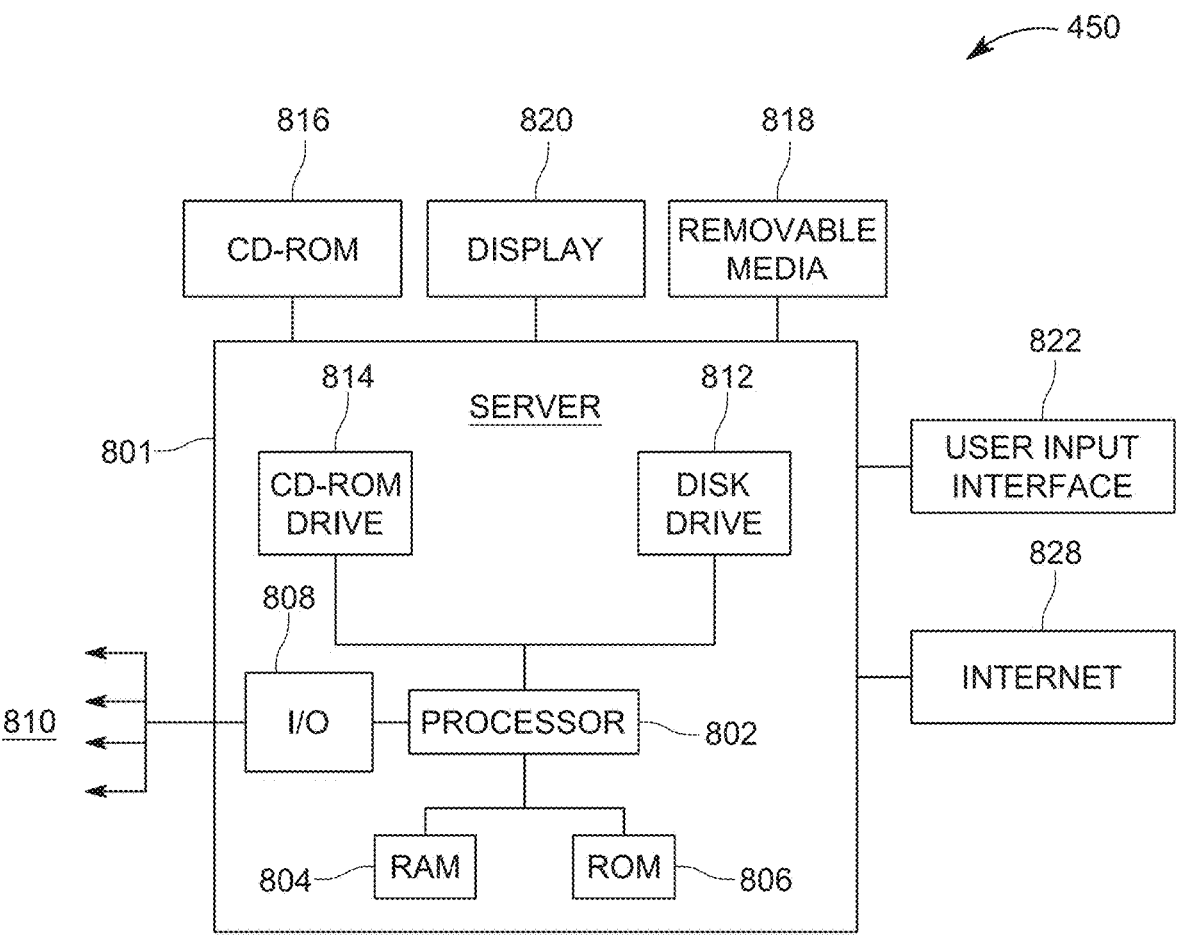
FIG. 8 is a schematic diagram of a computing device that is configured to implement the methods discussed herein.

The above-discussed procedures and methods may be implemented in a computing device as illustrated in FIG. 8. Hardware, firmware, software or a combination thereof may be used to perform the various steps and operations described herein. The computing device 450 is suitable for performing the activities described in the above embodiments and may include a server 801. Such a server 801 may include a central processor (CPU) 802 coupled to a random access memory (RAM) 804 and to a read-only memory (ROM) 806. ROM 806 may also be other types of storage media to store programs, such as programmable ROM (PROM), erasable PROM (EPROM), etc. Processor 802 may communicate with other internal and external components through input/output (I/O) circuitry 808 and bussing 810 to provide control signals and the like. Processor 802 carries out a variety of functions as are known in the art, as dictated by software and/or firmware instructions.

Server 801 may also include one or more data storage devices, including hard drives 812, CD-ROM drives 814 and other hardware capable of reading and/or storing information, such as DVD, etc. In one embodiment, software for carrying out the above-discussed steps may be stored and distributed on a CD-ROM or DVD 816, a USB storage device 818 or other form of media capable of portably storing information. These storage media may be inserted into, and read by, devices such as CD-ROM drive 814, disk drive 812, etc. Server 801 may be coupled to a display 820, which may be any type of known display or presentation screen, such as LCD, plasma display, cathode ray tube (CRT), etc. A user input interface 822 is provided, including one or more user interface mechanisms such as a mouse, keyboard, microphone, touchpad, touch screen, voice-recognition system, etc.

Server 801 may be coupled to other devices, such as sources, sensors, or any other imaging system. The server may be part of a larger network configuration as in a global area network (GAN) such as the Internet 828, which allows ultimate connection to various landline and/or mobile computing devices.

As described above, the apparatus 450 may be embodied by a computing device. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processor 802 may be configured to execute instructions stored in the memory device 804 or otherwise accessible to the processor. Alternatively, or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a pass-through display or a mobile terminal) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The term "about" is used in this application to mean a variation of up to 20% of the parameter characterized by this term. It will be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the present disclosure. The first object or step, and the second object or step, are both, objects or steps, respectively, but they are not to be considered the same object or step.

The terminology used in the description herein is for the purpose of describing particular embodiments and is not intended to be limiting. As used in this description and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

The disclosed embodiments provide a method and system for extracting most relevant information relative to a user's query from a large number (e.g., over 300) of tables. It should be understood that this description is not intended to limit the invention. On the contrary, the embodiments are intended to cover alternatives, modifications and equivalents, which are included in the spirit and scope of the invention as defined by the appended claims. Further, in the detailed description of the embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

REFERENCES

The entire content of all the publications listed herein is incorporated by reference in this patent application.

[1] Zhong, Victor, Caiming Xiong, and Richard Socher. "Seq2sql: Generating structured queries from natural language using reinforcement learning." *arXiv preprint arXiv:* 1709.00103 (2017).
[2] Lewis, Patrick, et al., "Retrieval-augmented generation for knowledge-intensive nlp tasks." *Advances in Neural Information Processing Systems* 33 (2020): 9459-9474.

[3] Liu, Qian, et al., "TAPEX: Table pre-training via learning a neural SQL executor." *arXiv preprint arXiv: 2107.07653 (2021).*

[4] Bertsimas, Dimitris, et al., "Tabtext: a systematic approach to aggregate knowledge across tabular data structures." *arXiv preprint arXiv: 2206.10381 (2022).*

[5] Hegselmann, Stefan, et al., "Tabllm: Few-shot classification of tabular data with large language models." *International Conference on Artificial Intelligence and Statistics. PMLR, 2023.*

What is claimed is:

1. A method for extracting and displaying desired information from a set of tables, the method comprising:

storing a set of tables including information associated with a subsurface of the Earth;

receiving a user query;

selecting a table from the set of tables based on an embedding search performed for a question vector, which is an embedding of the user query, on a vector database of table-column questions of the set of tables;

selecting one or more columns from the table based on a likelihood estimation performed in an embedding space, between (1) the user query and (2) a table summary and descriptions of columns for the selected table;

determining one or more rows associated with the one or more columns, based on unique values associated with each of the one or more columns, and a similarity measure between the user query and embedded values of the unique values, in the embedding space; and displaying one or more answers in response to the user query, wherein the one or more answers includes information from the one or more columns, and the one or more rows of the selected table.

2. The method of claim 1, wherein the vector database of table-column questions includes a table summary for each table of the set of tables, and the table summary is generated, for each table, by a large language model (LLM) based on (1) a table name, (2) columns of the table, and (3) additional information added by the user.

3. The method of claim 2, wherein the vector database of table-column questions further includes a set of questions generated by the LLM, for each column of the table, based on the corresponding table summary, column names, and description of the columns provided by the user.

4. The method of claim 3, wherein the step of selecting the table comprises:

performing an embedded search between (1) the user query and (2) the set of questions generated by the LLM, from the vector database of table-column questions, for a number k of columns from the table that have a highest similarity score with the user query.

5. The method of claim 4, wherein a reciprocal of the k highest similarity scores, for the k columns, is summed up for each table of the set of tables, and the table having the highest score is the selected table.

6. The method of claim 3, wherein the step of selecting one or more columns comprises:

performing a similarity search for the one or more columns based on questions, from the vector database of table-column questions, associated with the one or more columns of the selected table;

assigning a similarity score to each column of the one or more columns, wherein the similarity score is obtained by adding reciprocal similarity scores for each question associated with each column; and applying a cosine similarity in the embedding space to determine the one or more columns.

7. The method of claim 6, wherein the one or more columns includes about ten columns.

8. The method of claim 1, wherein the step of determining one or more rows comprises:

finding the unique values in each column of the one or more columns;

embedding the unique values; and performing a similarity search between the embedded unique values and the user query to determine the one or more rows.

9. The method of claim 8, further comprising:

selecting answers from the vector database of table-column questions that correspond to questions associated with the selected one or more rows.

10. A computing system for extracting and displaying desired information from a set of tables, the computing system comprising:

a storage device configured to store a set of tables including information associated with a subsurface of the Earth;

an interface configured to receive a user query; and a processor connected to the storage device and the interface and configured to, select a table from the set of tables based on an embedding search performed for a question vector, which is an embedding of the user query, on a vector database of table-column questions of the set of tables, select one or more columns from the table based on a likelihood estimation performed in an embedding space, between (1) the user query and (2) a table summary and description of the columns for the selected table, determine one or more rows associated with the one or more columns, based on unique values associated with each of the one or more columns, and a similarity measure between the user query and embedded values of the unique values, in the embedding space, and display one or more answers in response to the user query, wherein the one or more answers includes information from the one or more columns, and the one or more rows of the selected table.

11. The system of claim 10, wherein the vector database of table-column questions includes a table summary for each table of the set of tables, and the table summary is generated, for each table, by a large language model (LLM) based on (1) a table name, (2) columns of the table, and (3) additional information added by the user.

12. The system of claim 11, wherein the vector database of table-column questions further includes (1) a set of questions generated by the LLM, for each column of the table, based on the corresponding table summary, column names, and description of the columns provided by the user, and (2) a set of answers corresponding to the set of questions.

13. The system of claim 12, wherein the processor is further configured to:

perform an embedded search between (1) the user query and (2) the set of questions generated by the LLM, from the vector database of table-column questions, for a number k of columns from the table that have a highest similarity score with the user query.

14. The system of claim 13, wherein a reciprocal of the k highest similarity scores, for the k columns, is summed up for each table of the set of tables, and the table having the highest score is the selected table.

15. The system of claim 12, wherein the processor is further configured to:

perform a similarity search for the one or more columns based on questions, from the vector database of table-column questions, associated with the one or more columns of the selected table;

assign a similarity score to each column of the one or more columns, wherein the similarity score is obtained by adding reciprocal similarity scores for each question associated with each column; and apply a cosine similarity in the embedding space to determine the one or more columns.

16. The system of claim 10, wherein the processor is further configured to:

find the unique values in each column of the one or more columns;

embed the unique values;

perform a similarity search between the embedded unique values and the user query to determine the one or more rows; and select answers from the vector database of table-column questions that correspond to questions associated with the selected one or more rows.

17. A method for generating a vector database of table-column questions for a set of tables, the method comprising:

storing the set of tables;

generating, with a large language model, a summary of each table of the set of tables, based on a corresponding table title, column names of each table, and additional information;

generating, for each column of each table, a sub table containing the each column and a number of additional columns from the table, wherein rows of each column are selected to only include unique values;

passing the sub table to the LLM for generating at least (1) a question about the sub table and the table summary and (2) a corresponding answer; and storing questions and answers generated by the LLM, for all the tables of the set of tables, to form a vector database of table-column questions.

18. The method of claim 17, wherein the additional information includes user added information about the table.

19. The method of claim 17, wherein the sub-table includes between 1 and 4 additional columns and the additional columns are randomly selected from a corresponding table.

20. The method of claim 17, wherein at least one sub-table for each table includes the rows corresponding to all the unique values.

* * * * *